(12) United States Patent
Cai et al.

(10) Patent No.: US 8,165,561 B2
(45) Date of Patent: Apr. 24, 2012

(54) IMS NETWORKS PROVIDING BUSINESS-RELATED CONTENT TO WIRELESS DEVICES

(75) Inventors: Yigang Cai, Naperville, IL (US); Shiyan Hua, Lisle, IL (US)

(73) Assignee: Alcatel Lucent, Paris (FR)

( * ) Notice: Subject to any disclaimer, the term of this patent is extended or adjusted under 35 U.S.C. 154(b) by 1009 days.

(21) Appl. No.: 11/691,913

(22) Filed: Mar. 27, 2007

(65) Prior Publication Data
US 2008/0240016 A1    Oct. 2, 2008

(51) Int. Cl.
*H04M 11/04*    (2006.01)
*H04W 24/00*    (2009.01)
(52) U.S. Cl. .................... 455/404.2; 455/456.1
(58) Field of Classification Search .......... 370/328, 370/329, 338, 395.52, 254; 455/456.1–456.6, 455/435.1, 432.1, 444, 445; 713/200
See application file for complete search history.

(56) References Cited

U.S. PATENT DOCUMENTS

| 7,702,309 | B2* | 4/2010 | Faccin et al. | 455/404.2 |
| 2004/0081120 | A1 | 4/2004 | Chaskar | |
| 2005/0172148 | A1* | 8/2005 | Ying | 713/200 |
| 2006/0293065 | A1 | 12/2006 | Chew et al. | |
| 2007/0014282 | A1 | 1/2007 | Mitchell | |
| 2007/0094691 | A1* | 4/2007 | Gazdzinski | 725/62 |
| 2008/0037483 | A1* | 2/2008 | Ali et al. | 370/338 |
| 2008/0095070 | A1* | 4/2008 | Chan et al. | 370/254 |
| 2008/0108373 | A1* | 5/2008 | Agarwal et al. | 455/456.6 |
| 2009/0168696 | A1* | 7/2009 | Lindstrom et al. | 370/328 |

OTHER PUBLICATIONS

Ying Chen et al., "Location Aware Messaging-Integrating LBS Middleware and Converged Services," E-Business Engineering, ICEBE 2005, Oct. 12, 2005, pp. 419-426, IEEE International Conference on Beijing, China, Piscataway, NJ, USA.

* cited by examiner

*Primary Examiner* — Lester Kincaid
*Assistant Examiner* — Kuo Woo
(74) *Attorney, Agent, or Firm* — Duft Bornsen & Fishman, LLP

(57) ABSTRACT

IMS networks and methods are disclosed for providing business-related content to wireless devices that are located within a business. For a business that has a WLAN, wireless devices within range of the wireless access point of the business receive an identifier for the wireless access point. The wireless devices then register with the IMS network using the access point ID. Through the access point ID, the IMS network identifies an application server that is associated with the business. The application server may then initiate sessions with the wireless devices, and transmit business-related content to the wireless devices while they are within range of the wireless access point of the business.

20 Claims, 4 Drawing Sheets

US 8,165,561 B2

IMS NETWORKS PROVIDING BUSINESS-RELATED CONTENT TO WIRELESS DEVICES

BACKGROUND OF THE INVENTION

1. Field of the Invention

The invention is related to the field of communication networks and, in particular, to an IMS network that provides business-related content to a wireless device when the wireless device comes into range of a Wireless Local Area Network (WLAN) of the business.

2. Statement of the Problem

Location-based services are services offered by some cell phone providers for sending custom advertising and other content to cell-phone subscribers based on their present location. The cell phone provider obtains or determines the location of the cell phone, such as from a GPS signal, and then identifies content relevant to that location. The cell phone provider may then send the relevant content to the cell phone, such as in the form of a text message. As an example, a cell phone subscriber may subscribe to a service that provides information on restaurants that are in the same location as the subscriber.

One type of communication network gaining popularity is an IP Multimedia Subsystem (IMS) network. As set forth in the 3$^{rd}$ Generation Partnership Project (3GPP), IMS provides a common core network having access-agnostic network architecture for converged networks. The access network between an IMS subscriber and the IMS network may be a cellular network, a WLAN (e.g., a WiFi or a WiMAX network), or another type of access network. Service providers are accepting this architecture in next generation network evolution.

It is becoming more popular for businesses to have their own WLAN or have a shared WLAN amongst multiple businesses. For instance, coffee shops, airports, and restaurants commonly provide WiFi hotspots for use by their customers. The WLAN is implemented with one or more wireless access points, such as a WiFi or WiMAX access point. An individual in range of the wireless access point may receive service from the WLAN for checking email, surfing the Internet, etc. The individual may also place calls using a VoIP phone, or using a dual mode wireless phone that is able to place calls over a cellular network or a WLAN.

As communication networks evolve to using IMS networks as the core network, the WLANs of the businesses will be served by an IMS network. One problem with present IMS networks is that location based services have not been effectively defined or implemented in IMS networks, as may be desired.

SUMMARY OF THE SOLUTION

Embodiments of the invention solve the above and other related problems through an IMS network that provides business-related content to wireless devices when the wireless devices come into range of a WLAN of the business. According to embodiments provided herein, when a wireless device comes into range of a wireless access point of a business, the wireless device registers with the IMS network using an identifier for the wireless access point. The IMS network is then able to identify an application server that is associated with the business based on the access point ID. The application server may then transmit business-related content to the wireless device while the wireless device is located within the business. Through the IMS network, the business may advantageously provide advertisements, coupons, discounts, maps, or other content to wireless devices that are located within the business (i.e., within range of the WLAN of the business).

In one embodiment of the invention, assume that a wireless device comes into range of a wireless access point of a business. The wireless device identifies an access point ID for the wireless access point, and attempts to register with the IMS network by transmitting a register message that includes the access point ID to the IMS network. The IMS network of this embodiment includes an application server associated with the business, and a session control function. The session control function is adapted to receive the register message from the wireless device, and to process the access point ID in the register message to identify the application server that is associated with the business. The application server is then adapted to initiate a session with the wireless device, and to transmit business-related content to the wireless device during the session. For instance, the application server may provide advertisements, coupons, discounts, maps, etc, to the wireless device during the session.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-5 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
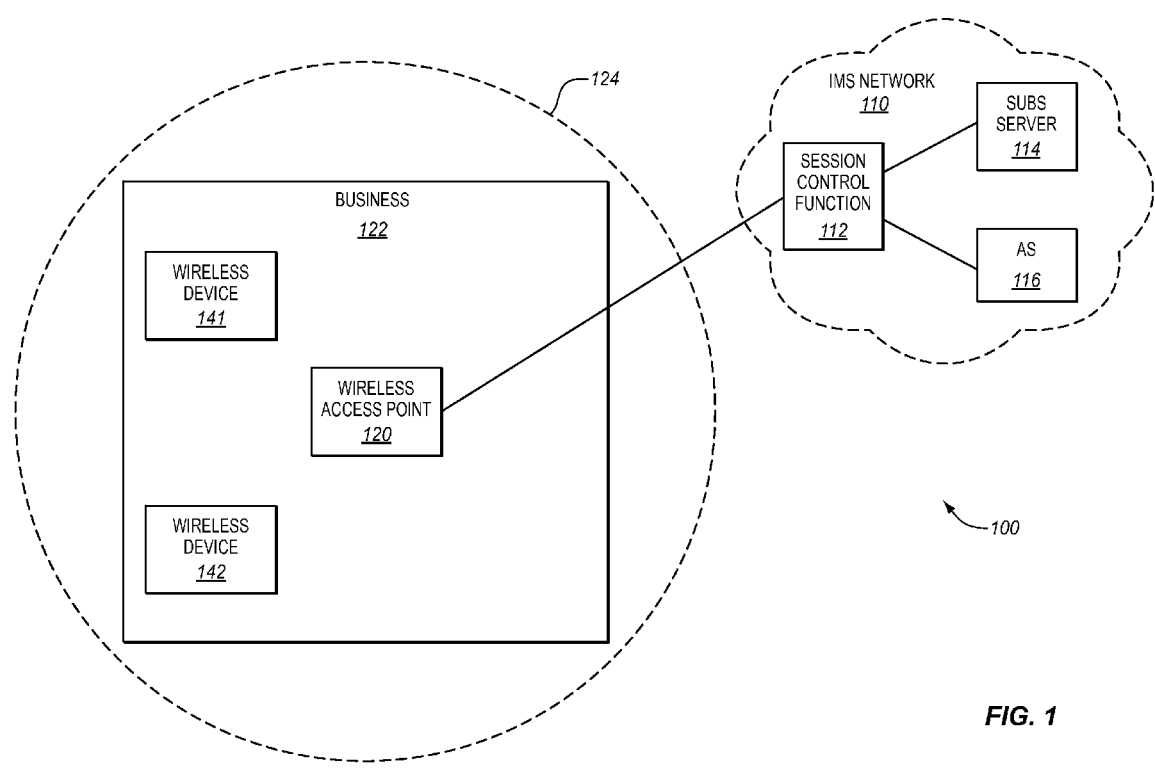
FIG. 1 illustrates a communication network in an exemplary embodiment of the invention.

FIG. 1 illustrates a communication network 100 in an exemplary embodiment of the invention. Communication network 100 includes an IMS network 110 and a wireless access point 120 connected to IMS network 110. Although one wireless access point 120 is shown for illustration, IMS network 110 may be connected to multiple other wireless access points or other access networks. Wireless access point 120 comprises a device adapted to communicate with wireless devices through wireless signals to form a Wireless Local Area Network (WLAN) 124. The WLAN 124 formed by wireless access point 120 may comprise a WiFi network, a WiMAX network, or another type of WLAN. Wireless access point 120 may use 802.11b, 802.11g, Bluetooth, or another type of protocol for communication. In this embodiment, wireless access point 120 is implemented in a business 122 to form the WLAN 124 for business 122. Although wireless access point 120 is illustrated inside of business 122, wireless access point 120 may be implemented in other locations outside of business 122. Similarly, although WLAN 124 is illustrated as covering only the area of business 122, WLAN 124 may have a larger service area that is shared with other businesses not shown in FIG. 1.

IMS network 110 includes a session control function 112, a subscriber server 114, and an application server (AS) 116. Session control function 112 comprises any system or server, such as a serving-call session control function (S-CSCF), that is adapted to initiate, maintain, and/or tear down sessions with IMS-compatible devices. Subscriber server 114 comprises any system or server, such as a Home Subscriber Server (HSS), that is adapted to store or maintain service profiles for users of IMS network 110. Subscriber server 114 may provide other functions, such as authentication functions. Application server 116 comprises any system or server adapted to provide business-related content to wireless devices. Application server 116 in this embodiment is associated with business 122. To be associated with business 122 means that application server 116 is owned or controlled by business 122, that the content provided by application server 116 is owned or controlled by business 122, or that the function or functions performed by application server 116 are specific to business 122. Application server 116 may be shared by multiple businesses, or may belong solely to business 122. Although application server 116 is illustrated as being outside of business 122, application server 116 may be physically located in business 122 or located in another location in IMS network 110.

In FIG. 1, two wireless devices 141-142 are in range of the WLAN 124 provided by wireless access point 120, and are consequently located within business 122. Wireless devices 141-142 are each configured to communicate with wireless access point 120 through wireless signals. One or both of wireless devices 141-142 may also be a dual-mode device meaning that the device can additionally communicate through another type of network, such as a CDMA network or a GSM network. Wireless devices 141-142 are also IMS-compatible devices meaning that they can register with IMS network 110 to receive service.

Wireless access point 120 continually broadcasts signals having identification information (also referred to as an access point ID) within its service area. The access point ID may comprise a MAC address for wireless access point 120, or may comprise another type of information. When a wireless device, such as wireless device 141, enters business 122 or is in a location close to business 122, the device comes into range of wireless access point 120. Wireless device 141 receives the access point ID of wireless access point 120 and performs a registration operation to establish communication with wireless access point 120. Wireless device 141 then operates as described in FIG. 2 to register with IMS network 110.

Figure 2:
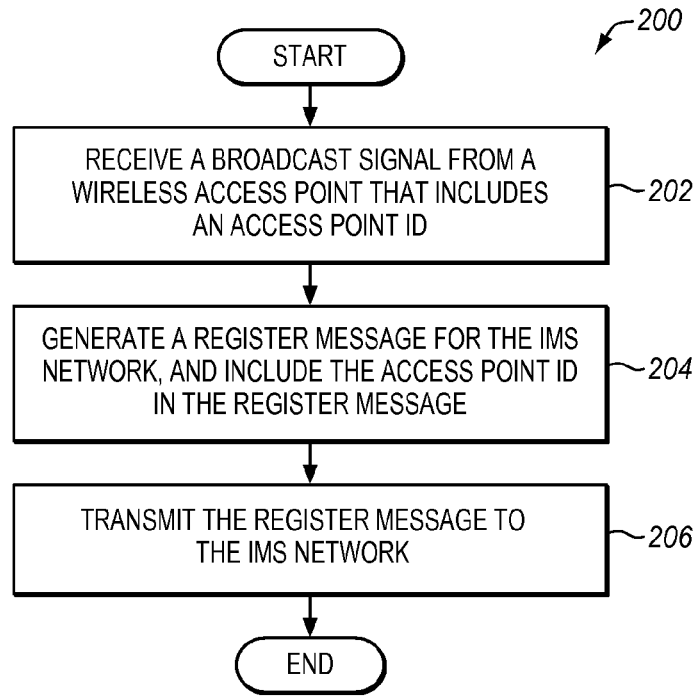
FIG. 2 is a flow chart illustrating a method of operating a wireless device in an exemplary embodiment of the invention.

FIG. 2 is a flow chart illustrating a method 200 of operating a wireless device in an exemplary embodiment of the invention. The steps of method 200 will be described with reference to communication network 100 in FIG. 1. The steps of the flow chart in FIG. 2 are not all inclusive and may include other steps not shown.

In step 202 of method 200, wireless device 141 receives the broadcast signal from wireless access point 120. As previously stated, the broadcast signal includes the access point ID for wireless access point 120. In step 204, wireless device 141 generates a register message to register wireless device 141 with IMS network 110, and includes the access point ID for wireless access point 120 in the register message. As an example, wireless device 141 may generate a SIP REGISTER message, and include the access point ID in a P-Visited-Network-ID parameter or another parameter of the REGISTER message. In step 206, wireless device 141 transmits the register message to IMS network 110. Wireless device 141 may transmit the register message to IMS network 110 through wireless access point 120, or may transmit the register message to IMS network 110 through another access network that is not illustrated in FIG. 1. Wireless device 142 in FIG. 1 may operate in a similar manner to register with IMS network 110.

Figure 3:
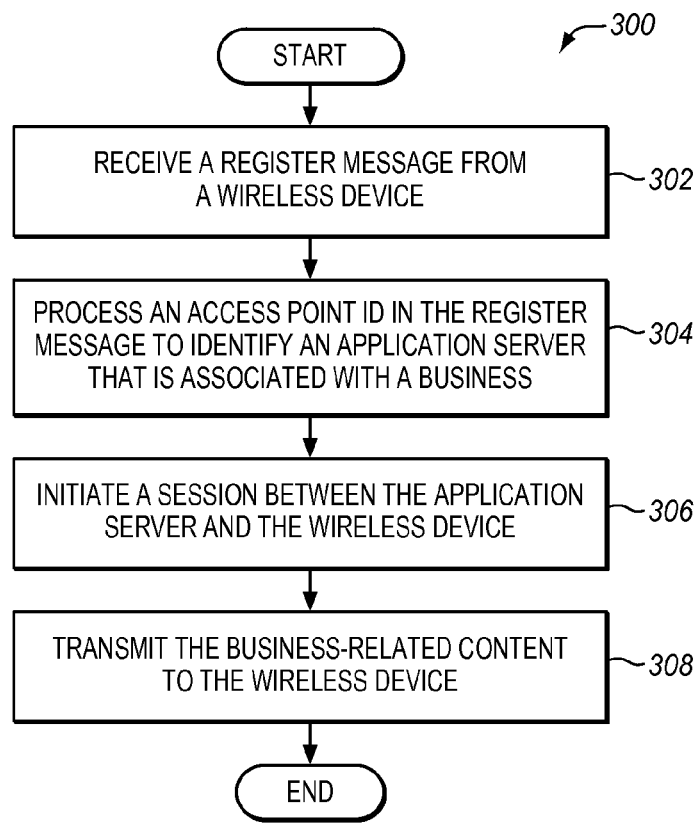
FIG. 3 is a flow chart illustrating a method of operating an IMS network to provide business-related content to wireless devices in an exemplary embodiment of the invention.

FIG. 3 is a flow chart illustrating a method 300 of operating an IMS network to provide business-related content to wireless devices in an exemplary embodiment of the invention. The steps of method 300 will be described with reference to communication network 100 in FIG. 1. The steps of the flow chart in FIG. 3 are not all inclusive and may include other steps not shown.

In step 302 of method 300, session control function 112 in IMS network 110 receives the register message from wireless device 141. Again, the register message includes the access point ID for wireless access point 120. In step 304, session control function 112 processes the access point ID to identify an application server 116 that is associated with business 122. IMS network 110 may include multiple application servers that are each associated with one or more businesses, so session control function 112 may use the access point ID for wireless access point 120 of business 122 to identify the application server 116 associated with business 122. As an example, session control function 112 may process a table or data structure that maps access point IDs to businesses, or maps access point IDs to application servers.

Session control function 112 may also determine if a user of wireless device 141 requested to receive business-related content for business 122. For instance, session control function 112 may retrieve a service profile for wireless device 141 from subscriber server 114. Session control function 112 may then process the access point ID and the service profile to determine if the user of wireless device 141 has subscribed to a service to receive business-related content for business 122.

Session control function 112 then contacts or notifies the application server 116 that is associated with business 122 through the appropriate messaging. In step 306, application server 116 initiates a session with wireless device 141 that is in range of wireless access point 120. As an example, application server 116 may transmit a SIP INVITE message to wireless device 141 to initiate the session. The session may be any type of data session that allows for the transfer of the business-related content to wireless device 141. For instance, the session may be a point-to-point video session where video may be provided to wireless device 141.

When the session is established with wireless device 141, application server 116 transmits the business-related content to wireless device 141 in step 308. The business-related content may comprise any information related to business 122 or relating to another person, business, or entity contracting with the business 122. For instance, the business-related content may comprise an advertisement, a coupon, a discount, a map, an award, or some other information. Because application server 116 is associated with business 122, application server 116 either stores the content or may have access to the content which business 122 desires to be presented to wireless device 141. The content may be personalized based on the user of wireless device 141, or may be generalized content relevant to any user of a wireless device that is located within business 122.

Responsive to receiving the business-related content, wireless device 141 displays or otherwise provides the content to a user. If the content is larger than the screen on wireless device 141, then wireless device 141 provides the appropriate scrolling or next-page functions to allow the user to navigate through the content. Wireless device 141 may also allow the user to perform interactive functions, such as retrieving a manufacturer's rebate, ordering a particular product, providing payment for a particular product, etc.

The duration of the session between application server 116 and wireless device 141 may depend on many factors. In one embodiment, application server 116 may maintain the session for the duration of time that wireless device 141 is in range of wireless access point 120. Session control function 112 may require that wireless device 141 re-register after a threshold time period. If wireless device 141 does not re-register after the time period, or registers with another access point ID, then application server 116 may end the session. In another embodiment, application server 116 may transmit the business-related content to wireless device 141 and then end the session. For instance, application server 116 may transmit a video file to wireless device 141 and then end the session once the video file has been transmitted.

Wireless device 142 in FIG. 1 may operate in a similar fashion to register with IMS network 110 (see FIG. 2). Upon registration, session control function 112 identifies the same application server 116, in this embodiment, that is associated with business 122. Application server 116 then initiates a session with wireless device 142, and transmits the business-related content to wireless device 142 during the session. Application server 116 may initiate sessions with multiple other wireless devices in range of wireless access point 120 in order to provide the business-related content to those devices.

Figure 4:
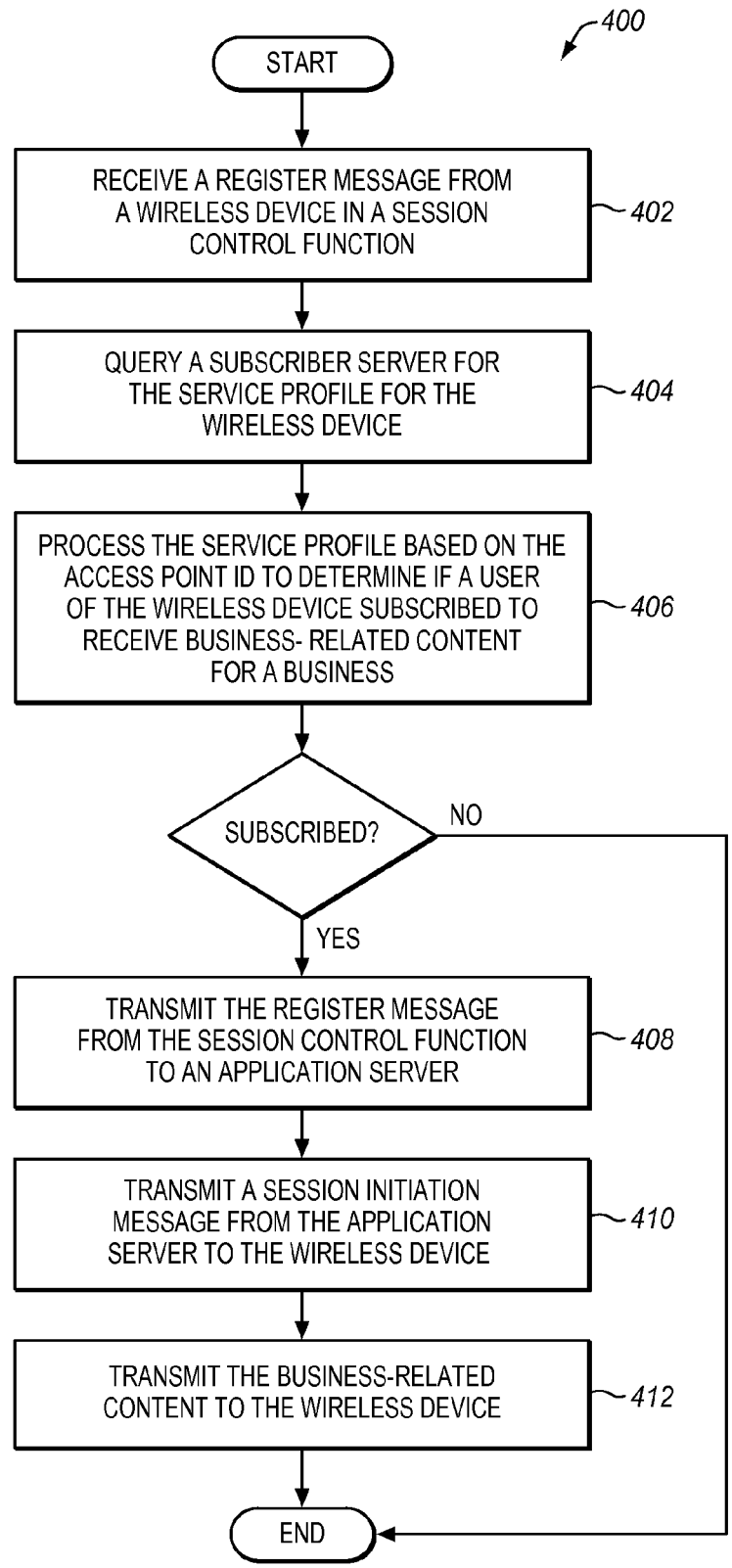
FIG. 4 is a flow chart illustrating a more detailed method of operating an IMS network to provide business-related content to wireless devices in an exemplary embodiment of the invention.

FIG. 4 is a flow chart illustrating a more detailed method 400 of operating an IMS network to provide business-related content to wireless, devices in an exemplary embodiment of the invention. The steps of method 400 will also be described with reference to communication network 100 in FIG. 1. The steps of the flow chart in FIG. 4 are not all inclusive and may include other steps not shown.

In step 402 of method 400, session control function 112 in IMS network 110 receives a register message from wireless device 141. Again, the register message includes the access point ID for wireless access point 120. In step 404, session control function 112 queries subscriber server 114 for the service profile for wireless device 141. In step 406, session control function 112 processes the service profile based on the access point ID to determine if a user of wireless device 141 subscribed to receive business-related content for business 122.

If a determination is made that the user of wireless device 141 subscribed to receive the business-related content, then session control function 112 identifies the application server 116 that is associated with business 122 and transmits the register message to application server 116 in step 408. Responsive to receiving the register message, application server 116 transmits a session initiation message to wireless device 141 to initiate a session with wireless device 141 in step 410. As an example, application server 116 may transmit a SIP INVITE message to wireless device 141 to initiate the session. When the session is established with wireless device 141, application server 116 transmits the business-related content to wireless device 141 in step 412.

Figure 5:
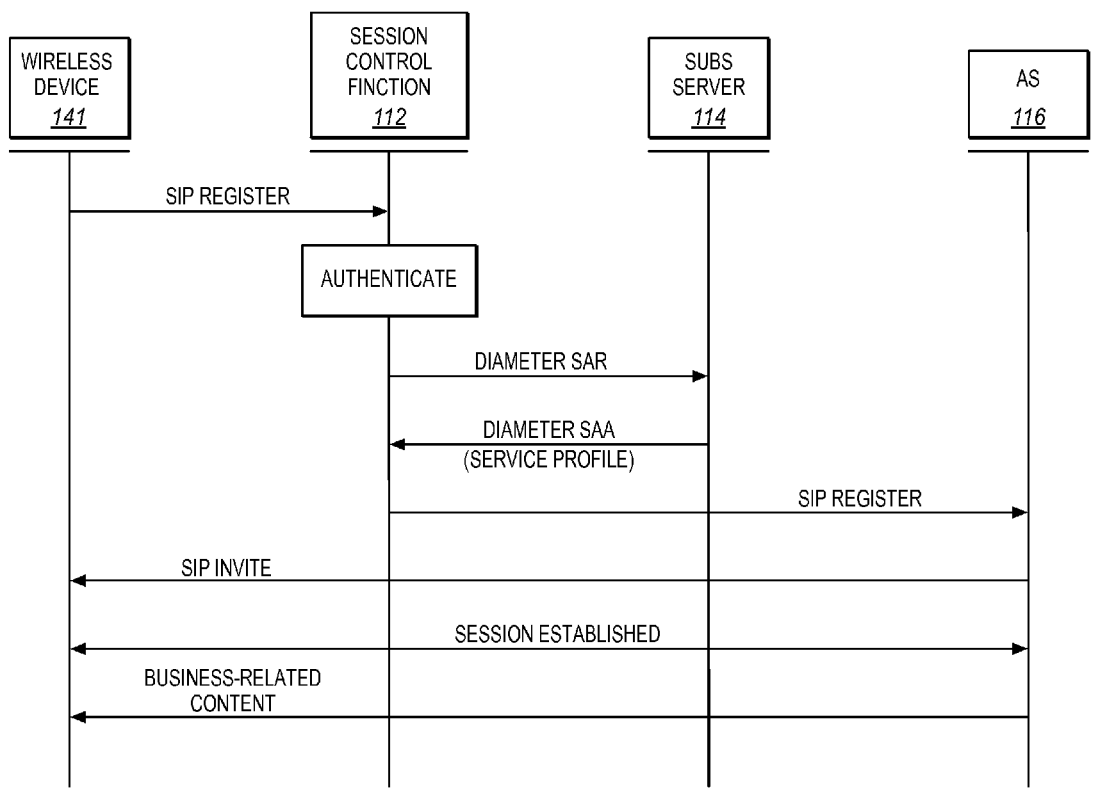
FIG. 5 is a message diagram illustrating messaging used to perform the method of FIG. 4 in an exemplary embodiment.

FIG. 5 is a message diagram illustrating the messaging used to perform method 400 in an exemplary embodiment. The messaging used in this example is SIP and Diameter, but other messaging protocols may be used in other embodiments. To begin, when wireless device 141 enters business 122 and is in range of wireless access point 120 (see also FIG. 1), wireless device 141 transmits a SIP REGISTER message to IMS network 110 in order to register with the network. The REGISTER message includes the access point ID for wireless access point 120 in a P-Visited-Network-ID parameter or another parameter. Session control function 112 receives the REGISTER message, and performs authentication for wireless device 141. Session control function 112 then transmits a Diameter Server Assignment Request (SAR) message to subscriber server 114 to retrieve the service profile for wireless device 141. Responsive to the SAR message, subscriber server 114 identifies the service profile for wireless device 141, based on the public or private ID for wireless device 141, and transmits a Diameter Server Assignment Answer (SAA) message to session control function 112. The SAA message includes the service profile for wireless device 141.

Session control function 112 processes initial filter criteria (iFC) in the service profile to identify one or more services to trigger for wireless device 141. Assume that the iFC for wireless device 141 includes a trigger condition for a SIP REGISTER message that includes an access point ID in the P-Visited-Network-ID parameter. The REGISTER message received by session control function 112 includes an access point ID for wireless access point 120, so the condition for the iFC is satisfied. Consequently, session control function 112 forwards the REGISTER message to application server 116. There may be multiple application servers that are providing business-related content, so session control function 112 may process the access point ID to identify the proper application server 116 to contact responsive to the trigger condition being satisfied.

Responsive to receiving the REGISTER message, application server 116 transmits a SIP INVITE message to wireless device 141 in order to initiate a session with wireless device 141. After the session is initiated, application server 116 transmits the business-related content to wireless device 141.

Similar messaging may take place for wireless device 142 to register with IMS network 110 (see also FIG. 1). If application server 116 needs to provide the business-related content to multiple wireless devices, then application server 116 may use a SIP fork mechanism to transmit the same SIP INVITE message to multiple wireless devices. Application server 116 will thus establish multiple sessions and will simultaneously provide the business-related content to multiple wireless devices that are located within business 122.

The above embodiments provide many advantages over prior communication networks. First, an application server 116 in the IMS network 110 is associated with a business 122, which allows business 122 to program or load the application server 116 with content that business 122 wants to provide to customers that are in their store and that are using a wireless device that can communicate with the WLAN 124 of the business 122. Second, IMS network 110 determines when a wireless device 141-142 is proximate to the business 122 based on the wireless access point with which the wireless device initiates communication. The wireless device includes the access point ID of the wireless access point in a register message to IMS network 110, and IMS network 110 is able to determine in which business 122 the wireless device is presently located based on the access point ID. Third, IMS network 110 provides real-time content to the wireless devices that are located in the business 122 through the designated application server 116. The application server 116 initiates a session with the wireless devices that are located in the business 122, and provides the desired content to the wireless devices. This advantageously allows the business 122 to transmit targeted advertisements, coupons, discounts, maps, etc, to wireless devices that are located within business 122 through a WLAN 124.

Although specific embodiments were described herein, the scope of the invention is not limited to those specific embodiments. The scope of the invention is defined by the following claims and any equivalents thereof.

We claim:

1. A system of an IMS network adapted to provide business-related content to wireless devices, the system comprising:
   a session control function in the IMS network adapted to receive a register message from a wireless device that is in range of a wireless access point of a business,
   wherein the register message is for registering the wireless device with the IMS network,
   wherein the register message includes an identifier for the wireless access point that is accessible to the mobile device,
   the session control function is further adapted to process the access point identifier from the register message to identify an application server in the IMS network that is associated with the business and is configured to share business-related content with a user of the wireless device as the user is located proximate to the business.

2. The system of claim 1 further comprising:
   the application server adapted to initiate a session with the wireless device, and to transmit the business-related content for the business to the wireless device over the session.

3. The system of claim 1 wherein the access point identifier comprises a MAC address for the wireless access point.

4. The system of claim 1 wherein session control function is further adapted to:
   process the access point identifier and a service profile for the user of the wireless device to determine if the user requested to receive the business-related content for the business identified by the access point identifier.

5. The system of claim 2 wherein:
   the session control function is further adapted to receive another register message from another wireless device that is in range of the wireless access point of the business, wherein the other register message includes the identifier for the wireless access point, and to process the access point identifier from the other register message to identify the application server that is associated with the business; and
   the application server is adapted to initiate another session with the other wireless device, and to transmit the business-related content to the other wireless device.

6. The system of claim 5 wherein:
   the application server is adapted to initiate the sessions using a SIP fork mechanism to transmit a SIP INVITE message to both of the wireless devices.

7. The system of claim 1 wherein the register message comprises a SIP REGISTER message with the access point identifier included in the P-Visited-Network-ID parameter of the SIP REGISTER message.

8. A method of providing business-related content to wireless devices through an IMS network, the method comprising:
   receiving a register message in a session control function of the IMS network from a wireless device that is in range of a wireless access point of a business,
   wherein the register message is for registering the wireless device with the IMS network,
   wherein the register message includes an identifier for the wireless access point that is accessible to the mobile device,
   processing the access point identifier from the register message to identify an application server in the IMS network that is associated with the business and is configured to share business-related content with a user of the wireless device as the user is located proximate to the business.

9. The method of claim 8 further comprising:
   initiating a session between the application server and the wireless device; and
   transmitting the business-related content for the business from the application server to the wireless device over the session.

10. The method of claim 8 wherein the access point identifier comprises a MAC address for the wireless access point.

11. The method of claim 8 further comprising:
    processing the access point identifier and the service profile for a user of the wireless device to determine if the user requested to receive the business-related content for the business identified by the access point identifier.

12. The method of claim 9 further comprising:
    receiving another register message in the session control function from another wireless device in range of the wireless access point of the business, wherein the other register message includes the identifier for the wireless access point;
    processing the access point identifier from the other register message to identify the application server that is associated with the business;
    initiating another session between the application server and the other wireless device; and
    transmitting the business-related content from the application server to the other wireless device.

13. The method of claim 12 wherein initiating the session between the application server and the wireless device and initiating the session between the application server and the other wireless device comprises:
    transmitting a SIP INVITE message to both of the wireless devices using a SIP fork mechanism.

14. The method of claim 8 wherein the register message comprises a SIP REGISTER message with the access point identifier included in the P-Visited-Network-ID parameter of the SIP REGISTER message.

15. An IMS network adapted to provide business-related content to wireless devices, the IMS network comprising:
    an application server in the IMS network that is associated with a business;
    a subscriber server in the IMS network that is adapted to store a service profile for a wireless device; and
    a session control function in the IMS network that is adapted to receive a register message from the wireless device that is in range of a wireless access point of the business,
    wherein the register message is for registering the wireless device with the IMS network,
    wherein the register message includes an identifier for the wireless access point,
    the session control function is further adapted to query the subscriber server for the service profile for the wireless device, to process the service profile based on the access point identifier from the register message to determine whether a user of the wireless device has subscribed to receive business-related content for the business, and to transmit the register message to the application server responsive to a determination that the user of the wireless device has subscribed;

the application server is adapted to transmit a session initiation message to the wireless device to initiate a session with the wireless device responsive to receiving the register message from the session control function, and to transmit the business-related content to the wireless device.

16. The IMS network of claim 15 wherein the application server is further adapted to:

initiate a point-to-point video session with the wireless device responsive to receiving the register message from the session control function; and transmit the business-related content to the wireless device as video.

17. The IMS network of claim 15 wherein the access point identifier comprises a MAC address for the wireless access point.

18. The IMS network of claim 15 wherein:

the session control function is further adapted to receive another register message from another wireless device that is in range of the wireless access point of the business, wherein the other register message includes the identifier for the wireless access point, to query the subscriber server for another service profile for the other wireless device, to process the other service profile based on the access point identifier from the other register message to determine whether a user of the other wireless device has subscribed to receive the business-related content for the business, and to transmit the other register message to the application server responsive to a determination that the user of the other wireless device has subscribed; and the application server is further adapted to transmit a session initiation message to the other wireless device to initiate another session with the other wireless device responsive to receiving the other register message from the session control function, and to transmit the business-related content to the other wireless device.

19. The IMS network of claim 18 wherein:

the session initiation message comprises a SIP INVITE message; and the application server is adapted to use a SIP fork mechanism to transmit the SIP INVITE message to both of the wireless devices.

20. The IMS network of claim 15 wherein the register message comprises a SIP REGISTER message with the access point identifier included in the P-Visited-Network-ID parameter of the SIP REGISTER message.

* * * * *